W. J. SILVER.
Shaft-Couplings.
No. 142,288. Patented August 26, 1873.
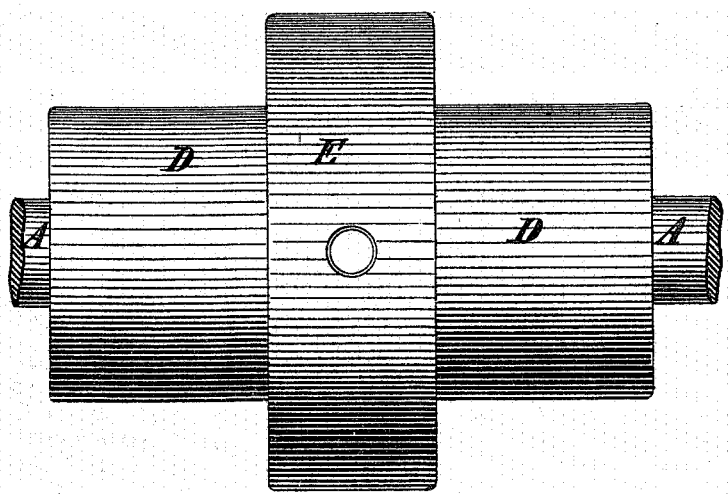
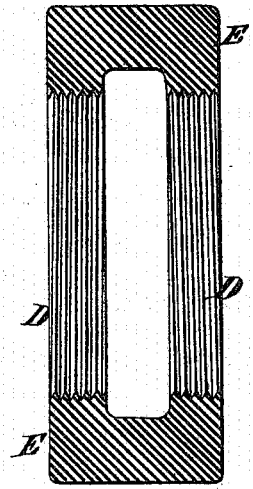
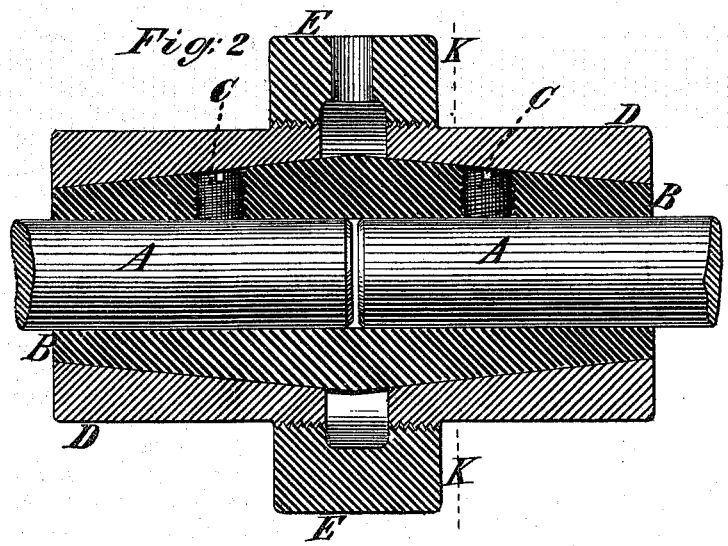
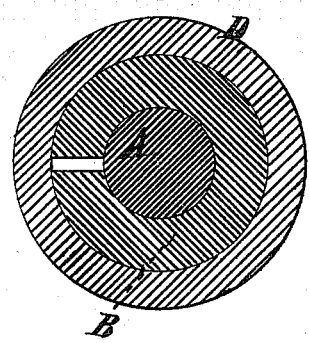
Witnesses:
Michael Ryan
Fred Hayn
Wm J. Silver
by his Attorneys
Brown & Allen

UNITED STATES PATENT OFFICE.

WILLIAM J. SILVER, OF SALT LAKE CITY, UTAH TERRITORY.

IMPROVEMENT IN SHAFT-COUPLINGS.

Specification forming part of Letters Patent No. 142,288, dated August 26, 1873; application filed August 4, 1873.

*To all whom it may concern:*

Be it known that I, WILLIAM J. SILVER, of Salt Lake City, in the Territory of Utah, have invented a Self-Centering Compression-Coupling, of which the following is a specification:

The object of this invention is to produce a shaft-coupling which is reliable, strong, and easily applicable and detachable. The invention consists in shaping the inner circumference of a collar or nut in the form of a double screw-thread, one right and one left handed, to fit two corresponding right and left handed screw-threads of two compression-shells, so that, by screwing the nut or collar, the conical shells are simultaneously and equally drawn together, while by the opposite motion of the nut they are in the same way moved apart.

Collars or nuts having but a single screw-thread, and made at one side with a flange to catch over a corresponding flange of one shell, have already been in use. A great defect of that construction is, however, that the two sides of the shell do not equally press on the sleeve that surrounds the two shaft ends, and that, therefore, the chief feature of a good coupling is lost, the shafts being liable to uncouple by their own action.

Figure 1 in the drawing is a side view of my improved shaft-coupling. Fig. 2 is a longitudinal section through the center of the same. Fig. 3 is a transverse section through the line $k\ k$, Fig. 2; and Fig. 4 is a detail central section of the nut.

Similar letters of reference indicate corresponding parts.

A A represent the ends of two lengths of shafting which are to be coupled together. B is a sleeve, bored parallel inside to suit the size of the shafting, and having its outer surface turned to the form of a double cone. C C are screws, passing through the sleeve B, and bearing against the shaft ends, so that the sleeve B can be firmly locked to the shaft ends. D D are two outer compression-shells, bored conical to fit the double cone of the sleeve B. E is a turned collar or ring-nut, having strong threads formed on both sides of its inner circumference, one of the threads being right, the other left handed. These threads fit into right and left handed corresponding threads formed on the upper sides of the inner ends of the shells D, so that, by turning the collar E, it will draw both parts of the shells D equally together, compressing thereby the split sleeve B, so that it tightly gripes the ends of the shafts and holds them firmly together.

The split sleeve, when drawn together by the action of the conical compression-shells, brings the length of shafting into a perfect straight line.

A single length in a line of shafting united with these couplings can be readily taken out, to shift a pulley, without disturbing the other lengths.

What I claim as my invention is—

A shaft-coupling consisting of the nut E, having female right and left hand screw-threads, of the compression-shields D D, having corresponding male right and left hand screw-threads, and the split double conical sleeve B, all arranged substantially as described.

WILLIAM J. SILVER.

Witnesses:
H. K. WHITNEY,
S. B. YOUNG.